United States Patent [19]

Andrieu et al.

[11] Patent Number: 5,442,197
[45] Date of Patent: Aug. 15, 1995

[54] SUPER-CAPACITOR COMPRISING POSITIVE AND NEGATIVE ELECTRODES MADE OF A P-DOPED ELECTRON CONDUCTIVE POLYMER AND AN ELECTROLYTE CONTAINING AN ORGANIC REDOX COMPOUND

[75] Inventors: Xavier Andrieu, Bretigny sur Orge; Laurence Kerreneur, Marcoussis, both of France

[73] Assignee: Alcatel Alsthom Compagnie Generale D'Electricite, Paris Cedex, France

[21] Appl. No.: 990,795

[22] Filed: Dec. 10, 1992

[30] Foreign Application Priority Data

Dec. 13, 1991 [FR] France ............... 91 15521

[51] Int. Cl.[6] .............. H01L 29/28; H01G 9/00; H01M 6/00; H01M 4/00
[52] U.S. Cl. ............... 257/40; 361/500; 361/502; 361/523; 361/524; 361/525; 361/527; 429/192; 429/198; 429/212; 429/213; 427/79; 427/80; 252/62.2; 252/182.1; 29/25.03
[58] Field of Search .............. 257/40; 361/500, 502, 361/523, 524, 525, 311, 312, 313, 319; 429/192, 194, 198, 212, 213; 29/25.03, 623.5; 427/79, 80; 252/182.1, 62.2; 204/410, 421, 414, 418

[56] References Cited

U.S. PATENT DOCUMENTS 3,288,641 11/1966 Rightmire .

FOREIGN PATENT DOCUMENTS

| 0093539 | 11/1983 | European Pat. Off. . |
| 0105768 | 4/1984 | European Pat. Off. . |
| 0136635 | 4/1985 | European Pat. Off. . |
| 0300330 | 7/1988 | European Pat. Off. . |
| 0319182 | 6/1989 | European Pat. Off. . |
| 89 10952 | 7/1989 | France . |

OTHER PUBLICATIONS

Patent Abstracts of Japan, vol. 12, No. 94 (E-593)(2941) Mar. 26, 1988 & JP-A-62 226 568 (Sanyo Electric Co Ltd).

*Primary Examiner*—Andrew J. James
*Assistant Examiner*—Alice W. Tang
*Attorney, Agent, or Firm*—Sughrue, Mion, Zinn, Macpeak & Seas

[57] ABSTRACT

A super-capacitor comprising a positive electrode, a negative electrode, both made of a p-doped electron conductive polymer, and an electrolyte. The electrolyte comprises an organic redox compound soluble in the electrolyte in an amount of at least $10^{-3}$ mole per liter. The redox potential of the redox compound lies in a non-capacitive region of the electron conductive polymer. The redox compound is reduced in a reversible manner at the negative electrode when the potential of the negative electrode is equal to or less than the redox potential of the redox compound, and the redox compound is oxidized in a reversible manner at the positive electrode when the potential of the positive electrode is equal to or more than the redox potential of the redox compound.

4 Claims, 5 Drawing Sheets

SUPER-CAPACITOR COMPRISING POSITIVE AND NEGATIVE ELECTRODES MADE OF A P-DOPED ELECTRON CONDUCTIVE POLYMER AND AN ELECTROLYTE CONTAINING AN ORGANIC REDOX COMPOUND

FIELD OF THE INVENTION

The present invention concerns a super-capacitor based on a conductive polymer.

BACKGROUND OF THE INVENTION

P-doped electron conductive polymers, such as polypyrrole, polythiophene, polyaniline, exhibit a pseudo-capacitive behavior in their electro-chemistry; in other words, the quantity of electricity stored in the material is proportional to the applied voltage. This property disappears when the polymer loses its dopant and becomes insulating.

These polymers have very high specific capacitances, in the order of 200 F/g, which is much greater than obtains with carbon compounds of the active carbon type. These materials can thus be used to advantage as the active electrode material in super-capacitors.

Patents EP-A 300 330 and FR-A 89 10952 describe super-capacitors using polypyrrole. However it is found that the energy stored in these super-capacitors ($\frac{1}{2} CV^2$) is not very high because of their low voltage (1.2 volts to 1.3 volts). It is the fall-off in mean potential of the electrodes which is responsible for this low voltage.

Taking the example of a super-capacitor whose electrodes are based polypyrrole (ppy) doped with $ClO_4^-$ ions, the behavior during discharge can be schematized by the following reactions:

negative electrode

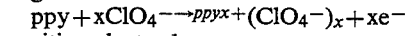

positive electrode

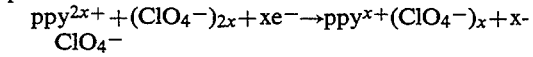

The negative electrode becomes doped and the positive electrode loses dopant.

It is observed that because of stray currents at high potential, a low Faradic yield of the electrodes or a large excess voltage, the negative electrode is "pushed" by the positive electrode towards a noncapacitive region. This leads to a loss of capacitance of the capacitor (loss of ultimate capacitance on the case of uni-polar cycling).

SUMMARY OF THE INVENTION

The object of the present invention is to reduce these problems and to provide a super-capacitor based on a conductive polymer whose voltage will be close to the theoretically possible value, for example 2 volts with polypyrrole.

The present invention provides a super-capacitor comprising a positive electrode, a negative electrode, both based on a p-doped electron conductive polymer, and an electrolyte, characterized in that it further comprises an electro-chemical shuttle constituted by an organic compound soluble in said electrolyte, in a proportion at least equal to $10^{-3}$ mole per liter, of which the redox potential lies in a non-capacitive region of said electron conductive polymer., and which reduces at the negative electrode and oxidizes at the positive electrode in a reversible manner, when the potential at these electrodes allows.

Accordingly, in the course of charging, if the potential of the negative electrode becomes equal to or less than the redox potential of said electro-chemical shuttle, the latter is reduced. It is then regenerated by oxidation at the negative electrode.

As a result, the excursion of the negative electrode potential towards the non-capacitive region is limited.

By way of example, the concentration of the shuttle in the electrolyte may be between $10^{-3}$ mole/liter and 1 mole/liter.

This depends mainly on:
its solubility
its constant of diffusion
the number of electrons exchanged
the shape of the super-capacitor.

The said polymer is preferably selected from polypyrrole, polythiophene, polyaniline and their derivatives.

The electrolyte is preferably aprotic and has an extended range of electroactivity; it is of the type of electrolytes used in lithium-based cells.

Other features and advantages of the present invention will appear in the course of the following description of embodiments given by way of example and without limitation.

DETAILED DESCRIPTION OF THE INVENTION

Example 1

Prior Art

A super-capacitor is formed using two polypyrrole electrodes of 16 mg each. There is 20% carbon black in each electrode. The polypyrrole is prepared in accordance with FR-A 89 10952. Namely, a mixture of polypyrrole and carbon black is pressed at 20° C. for 20 seconds with an applied pressure of 650 Kg/cm². Then, the pellet is impregnated with an electrolyte composed of a solution of $LiClO_4$ (1M) in propylene carbonate.

The device is mounted in a test cell of Teflon, which comprises a lithium reference electrode in order to measure the potential of each polypyrrole electrode. After setting up and cycling between 0 and 2 V, the characteristics of the super-capacitor were as follows:

useful voltage: 1.18 V
capacitance: 0.22 mAh; 0.67 F

Figure 1:
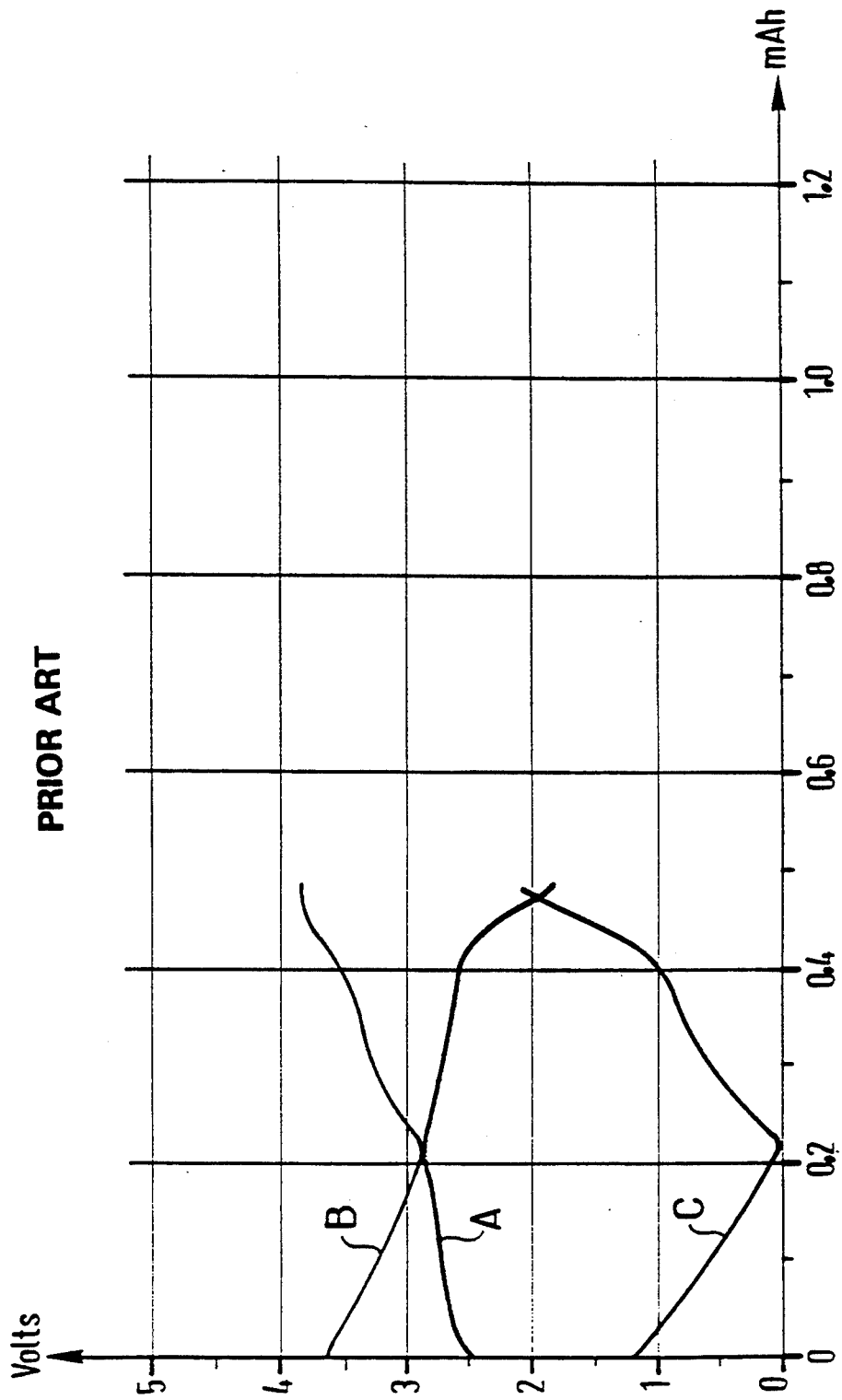
FIG. 1 shows cycling graphs (voltage-current plots) for a super-capacitor according to the prior art.

The cycling graphs are shown in FIG. 1; (abscissa in mAh, ordinate in volts).

The graph A corresponds to the potential of the negative electrode, graph B to that of the positive electrode and graph C to the cell voltage.

Particularly, FIG. 1 shows the change in potential of the electrodes and the change in voltage of the cell during cycling between 0 V and 2 V. Graph C corresponds to the change in voltage of the cell, namely, a decrease from 1.18 V to 0 V during the discharge period, then an increase from 0 V to 2 V during the charging period. The cell voltage is 0 V when the potential of each electrode is equal to about 2.9 V.

Graph A represents the change in potential of the negative electrode during this same time period, which is measured in reference to the lithium reference electrode. The potential of the negative electrode increases from about 2.5 V to about 2.9 V during the discharging period, and then decreases from 2.9 V to less than 2 V during the charging period. At the end of the charge, the potential falls in the non-capacitive region to under about 2.5 V.

Similarly, graph B shows the change in potential of the positive electrode, which is measured in reference to the lithium reference electrode. The potential of the positive electrode decreases from about 3.6 V to about 2.9 V during the discharging period, and then increases from 2.9 V to less than 4 V during the charging period.

Example 2

The super-capacitor of example 1 was employed. In the course of cycling, trinitrofluorenone was added to the electrolyte solution in the proportion of 6 parts per 1000 by weight.

Figure 2:
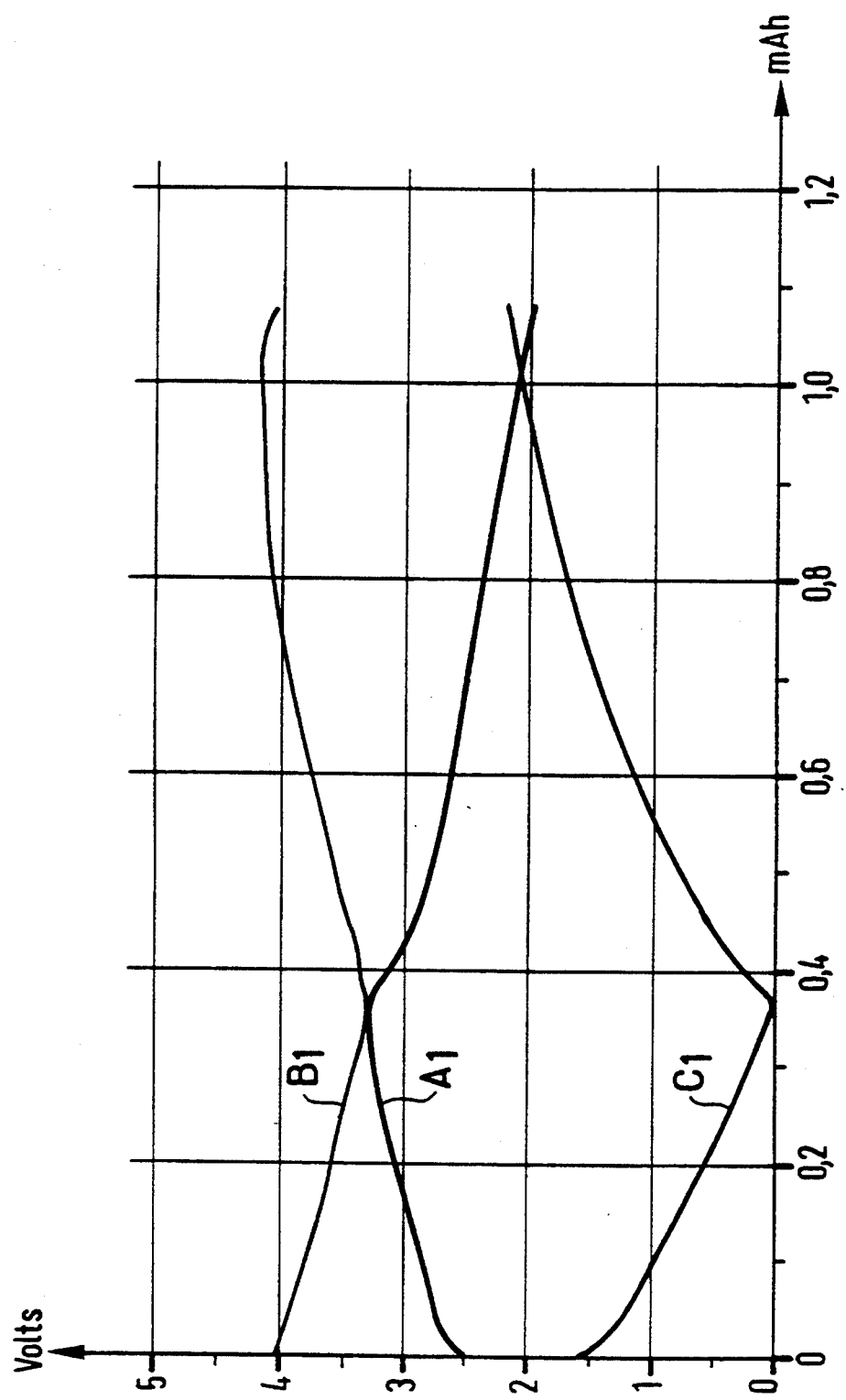
FIG. 2 shows cycling graphs for a super-capacitor in accordance with the invention.

The characteristics measured after this addition were as follows:
useful voltage: 1.6 V
capacitance: 0.36 mAh, 0.81 F The cycling graphs are shown in FIG. 2. The graphs A1, B1, C1 are to be compared with the graphs A, B, C of example 1.

The energy of the super-capacitor ($\frac{1}{2} CV^2$) has been increased by 107% relative to that of example 1.

More particularly, FIG. 2 shows cycling graphs similar to those of FIG. 1. Graph C1 corresponds to the change in voltage of the cell; namely, a decrease from 1.6 V to 0 V during the discharging period, then an increase from 0 V to 2 V during the charging period. The voltage of the cell is 0 V when the potential of each electrode is equal to about 3.4 V. Addition of the organic redox compound of the invention increases the cell capacity.

Graph A1 shows the change in potential of the negative electrode, which is measured in reference to the lithium reference electrode. The potential of the negative electrode increases from about 2.5 V to about 3.4 V during the discharging period, then decreases from 3.4 V less than 2 V during the charging period. At the end of the charge, the potential does not fall. By employing the organic redox compound of the invention, the non-capacitive region is not reached between the voltage limits of the cycling and the capacity thereby increases.

Graph B1 shows the change in potential of the positive electrode, which is measured in reference to the lithium reference electrode. The potential of the positive electrode decreases from about 4 V to about 3.4 V during the discharging period, and then increases from 3.4 V to more than 4 V during the charging period.

Example 3

Prior Art

This was run in the same way as example 1, save that the mass of the polypyrrole of each electrode was 13 mg.

The characteristics measured after setting up were as follows:
useful voltage: 1.26 V
capacitance: 0.15 mAh, 0.5 F The cycling graphs appear in FIG. 3 and are referenced A', B', C'.

Figure 3:
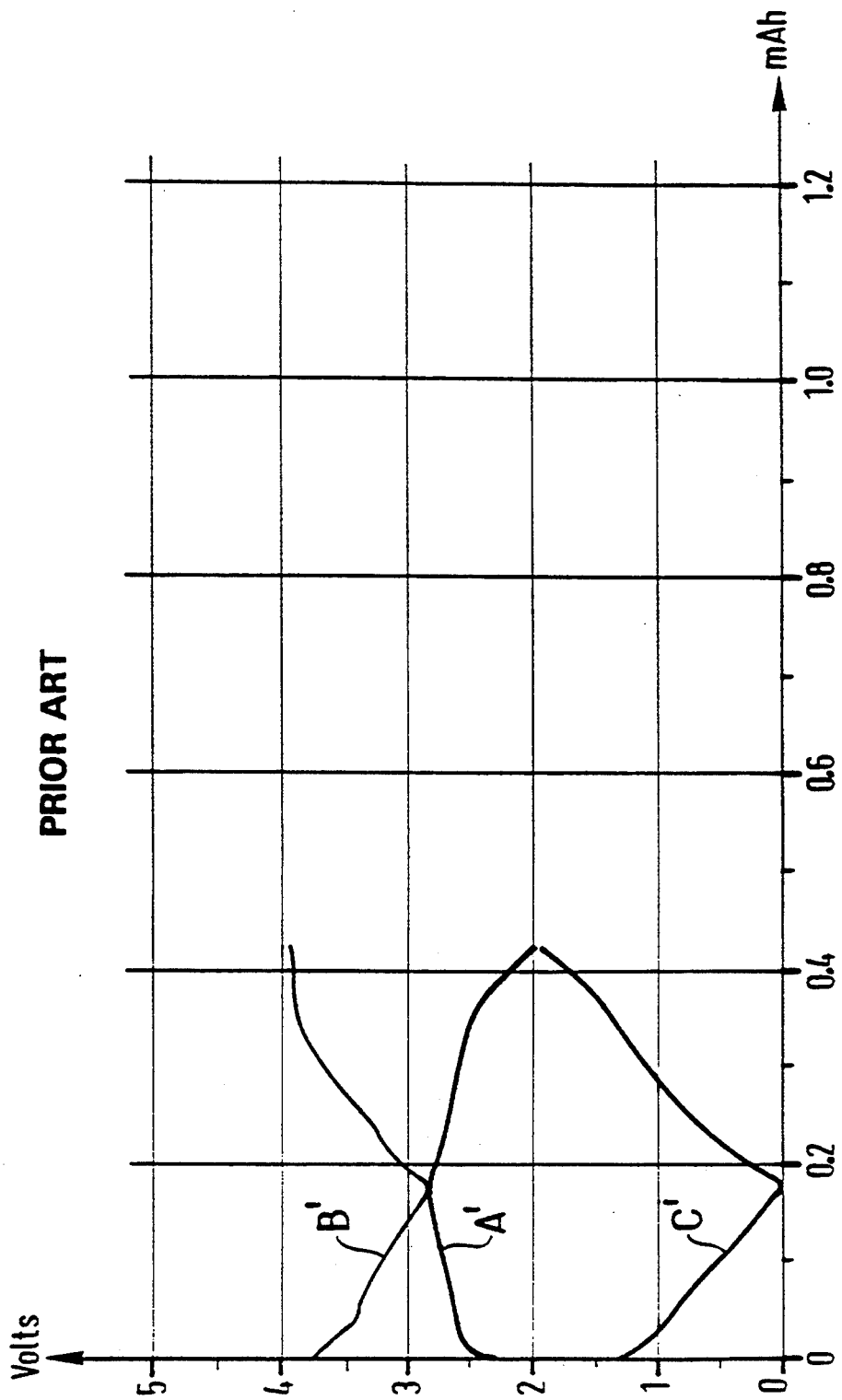
FIG. 3 shows graphs like those of FIG. 1 for a super-capacitor of the prior art.

More particularly, FIG. 3 shows cycling graphs similar to those of FIG. 1. Graph C' corresponds to the change in voltage of the cell, namely, a decrease from 1.26 V to 0 V during the discharging period, then an increase from 0 V to 2 V during the charging period. The voltage of the cell is 0 V when the potential of each electrode is equal to about 2.9 V.

Graph A' shows the change in potential of the negative electrode, which is measured in reference to the lithium reference electrode. The potential of the negative electrode increases from about 2.3 V to about 2.9 V during the discharging period, and then decreases from 2.9 V to 2 V during the charging period. At the end of the charging period, the potential falls in the non-capacitive region to under about 2.5 V.

Graph B' shows the change in potential of the positive electrode, which is measured in reference to the lithium reference electrode. The potential of the positive electrode decreases from about 3.7 V to about 2.9 V during the discharging period, and then increases from 2.9 V to less than 4 V during the charging period.

Example 4

Using the super-capacitor of example 1, in the course of cycling, 9,10 phenanthrequinone was added in the proportion of 6 parts per 1000 by weight.

The measured characteristics were as follows:
useful voltage: 1.48 V
capacitance: 0.34 mAh, 0.82 F The cycling graphs appear in FIG. 4 and are referenced A'1, B'1, C'1.

The energy of the super-capacitor has been increased by 170%.

Figure 4:
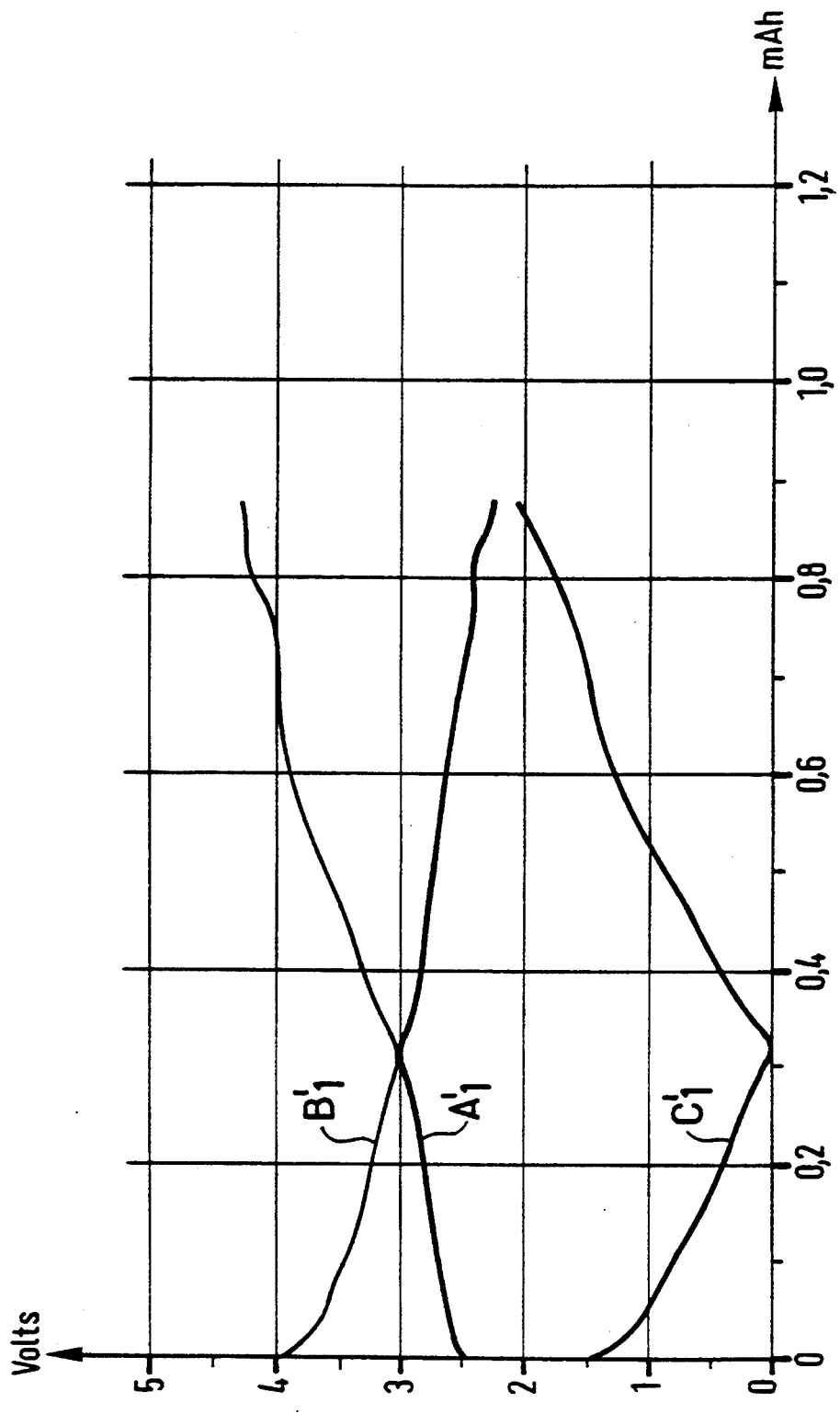
FIG. 4 shows graphs like those of FIG. 2 for a Super-capacitor in accordance with the invention.
Figure 5:
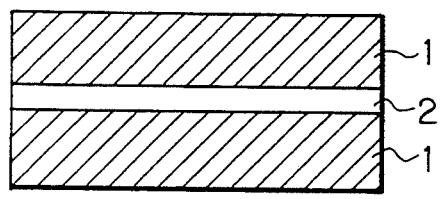
FIG. 5 shows a super-capacitor including positive and negative electrodes 1, which are the same in this case, and electrolyte 2 in accordance with the invention.

More particularly, FIG. 4 shows cycling graphs similar to those of FIG. 2. Graph C'1 corresponds to the change in voltage of the cell, namely, a decrease from 1.48 V to 0 V during the discharging period, then an increase from 0 V to 2 V during the charging period. The voltage of the cell is 0 V when the potential of each electrode is equal to about 3 V. Addition of the organic redox compound of this invention increases the cell capacity.

Graph A'1 shows the change in potential of the negative electrode, which is measured in reference to the lithium reference electrode. The potential of the negative electrode increases from about 2.5 V to about 3 V during the discharging period, then decreases from 3 V to more than 2 V during the charging period. At the end of the charging period, the potential does not fall. By employing the organic redox compound of the invention, the non-capacitive region is not reached between the voltage limits of the cycling and the capacity thereby increases.

Graph B'1 shows the change in potential of the positive electrode, which is measured in reference to the lithium reference electrode. The potential of the positive electrode decreases from about 4 V to about 3 V during the discharging period, then increases from 3 V to more than 4 V during the charging period.

Obviously the invention is not limited to the preceding embodiments.

What is claimed is:

1. A super-capacitor comprising a positive electrode having a potential, a negative electrode having a potential, both made of a p-doped electron conductive polymer, and an electrolyte, said electrolyte comprising an organic redox compound having a redox potential soluble in said electrolyte in an amount of at least $10^{-3}$ mole per liter, the redox potential of said redox compound lies in a non-capacitive region of said electron conductive polymer, the redox compound is reduced in a reversible manner at the negative electrode when the potential of the negative electrode is equal to or less than the redox potential of the redox compound, and the redox compound is oxidized in a reversible manner at the positive electrode when the potential of the positive electrode is equal to or more than the redox potential of the redox compound.

2. A super-capacitor according to claim 1, wherein said conductive polymer is selected from polypyrrole, polythiophene, polyaniline and their derivatives.

3. A super-capacitor according to claim 1, wherein said electrolyte is an aprotic electrolyte.

4. A super-capacitor according to claim 1, wherein the organic redox compound is selected from trinitrofluorenone and phenanthrequinone.

* * * * *